Oct. 13, 1970  HANS-WALTHER BRANDT ET AL  3,533,609
FLIGHTED TRICKLE COLUMN

Filed July 18, 1968

INVENTORS:
HANS WALTHER BRANDT, KARL HERMANN REISSINGER, PETER SCHMICKLER.
BY:
Burgess, Dinklage & Sprung

United States Patent Office 3,533,609
Patented Oct. 13, 1970

3,533,609
FLIGHTED TRICKLE COLUMN
Hans-Walther Brandt, Cologne-Flittard, and Karl-Hermann Reissinger and Peter Schmickler, Leverkusen, Germany, assignors to Farbenfabriken Bayer Aktiengesellschaft, Leverkusen, Germany, a corporation of Germany
Filed July 18, 1968, Ser. No. 745,831
Claims priority, application Germany, Aug. 8, 1967, F 53,173
Int. Cl. B01d 3/24
U.S. Cl. 261—113                    4 Claims

ABSTRACT OF THE DISCLOSURE

A flighted trickle column is comprised of plates which are folded zig-zag fashion or are corrugated. The plates are arranged horizontally one above the other in the column tower in such a way as to cross alternately and are provided with openings for ascending vapours.

---

This invention to a flighted trickle column whose flights comprise plates which are folded zig-zag fashion or are corrugated, which are arranged horizontally one above the other in the column tower in such a way as to cross alternatively, and which are provided with openings for ascending vapours.

The object of the invention is to adapt built-in plates, such as these, in such a way that they are suitable for use in particular for high-vacuum operation in material exchange columns, despite the smallness of the quantities of refluxing material that accumulate relative to the column cross-section, and to achieve, by means of the built-in trays or plates themselves, an effective distribution of liquid over the entire cross-section of the column, so that there is no need to use expensive distributors either above or within the flights.

According to the invention, this object is achieved by arranging the openings in the plates crosswise to the folded edges or the channels in the plates, and by designing those portions of the plates left between the openings as drainage pockets for the liquid. A liquid trickling downwards into each of the several drainage pockets in the plate, flows towards each end of the short channel of the pocket and is thus divided into two streams. By virtue of this distribution of the descending liquid in the many channels, progressing steadily from plate to plate, the liquid is rapidly and uniformly distributed over the entire cross-section of the column.

Distribution is particularly effective with plates that are stacked alternately crosswise one above the other and hence with drainage pockets lying crosswise. The openings are in the form of equidistant parallel slots which are staggered alternately relative to the adjacent edges or channels of the plate.

In one modification, the openings are in the form of parallel cutouts extending transversely of boundary flanges parallel to the edges or channels, the arrangement being such that those stamped portions of the plate that are connected with the flanges parallel to the edges or channels are alternately bent out of the plane of the plate in opposite directions.

To prevent the plates from sliding, so that the drainage pockets of one plate fit into the slots of a lower plate, arranged transversely to the first, the slots or cutouts are advantageously arranged obliquely relative to the folded edges or channels of the plates.

Embodiments of the invention are diagrammatically illustrated by way of example in the accompanying drawings, wherein.

Figure 1:
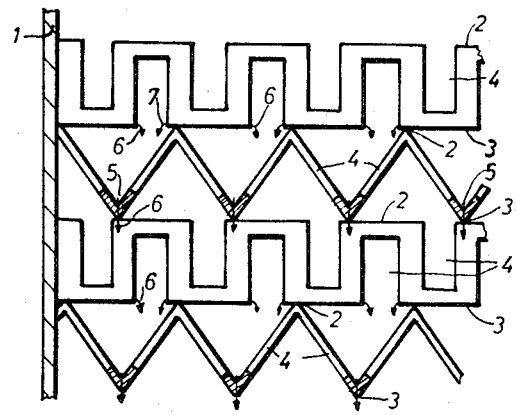
FIG. 1 is a cross-section on the line A-B of FIG. 2 through part of a column with plates folded zig-zag fashion stacked crosswise one above the other.
Figure 2:
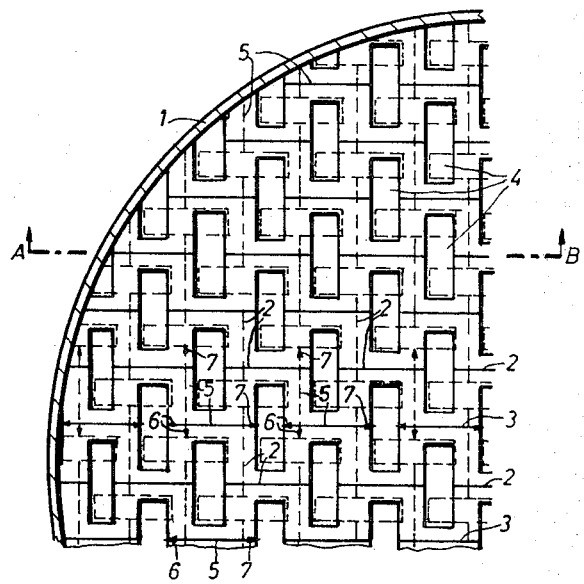
FIG. 2 is a plan view of the upper plate, shown in FIG. 1, the plate directly beneath it being shown in chain lines.
Figure 3:
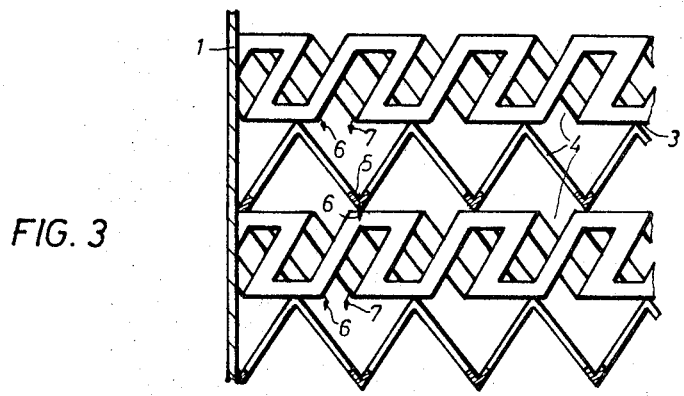
FIG. 3 is a cross-section on the line C-D of FIG. 4 through part of a column with plates folded zig-zag fashion stacked crosswise one above the other, and provided with inclined slots.
Figure 4:
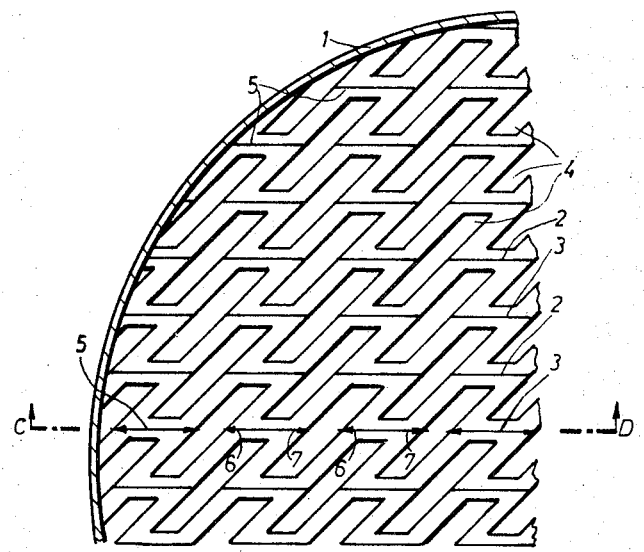
FIG. 4 is a plan view of the upper plate shown in FIG. 3, with inclined slots.
Figure 5:
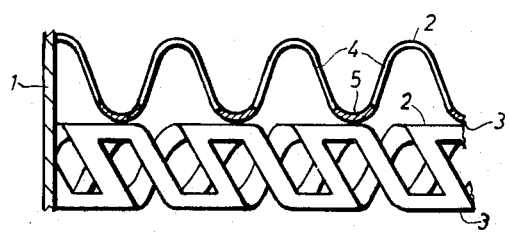
FIG. 5 shows two fluted or corrugated plates arranged crosswise one above the other.

Referring now to the drawings, the tower walls of a trickle column are denoted in each figure, by the reference 1, the upper folded edges or channels of the zig-zag plates are denoted by the reference 2 and the lower folded edges or channels by the reference 3. The zig-zag plates shown in FIGS. 1, 2, 3 and 4 and the fluted plates shown in FIG. 5 are provided with slots 4 which are arranged crosswise relative to the folded edges or channels. The portions left between the slots 4 form collecting pockets for the liquid and constitute short drainage channels 5. The arrows 6 and 7 show the directions in which the liquid flows out of these channels 5. As shown in FIG. 2, the liquid flows off towards each end of the channels 5 in the direction of the arrows 6, 7, passing from the upper plate through the slots 4 into the pockets and hence into the channels 5 of the plate lying crosswise beneath it, in which there is a change in direction of flow relative to the preceding pockets. This cycle is repeated from plate to plate.

The plates shown in FIGS. 6 and 7 comprise stamped portions which form drainage pockets 5 and which are limited by flanges 8, the stamped portions being bent alternately above and below the plane of the plate. The arrows 6 and 7 indicate the direction in which the liquid flows out of the drainage channels 5. Even with plates such as these, stacked crosswise above one another in the tower of the column, the component streams of liquid flow from the pockets in one tray or plate into the pockets of the plate below, where they undergo a change in their direction of flow.

Figure 6:
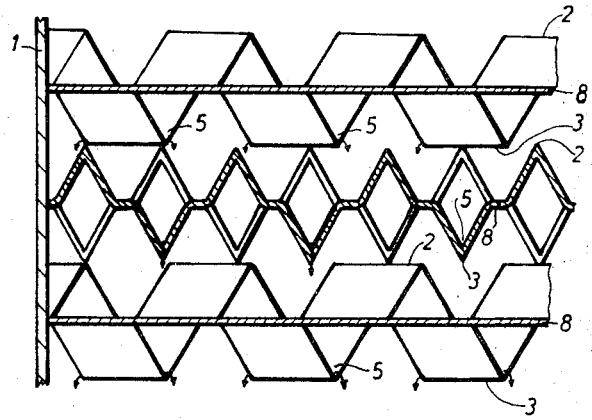
FIG. 6 is a section through plates stacked crosswise, one above the other, with stamped portions bent alternately in opposite directions out of the plane of the plates.
Figure 7:
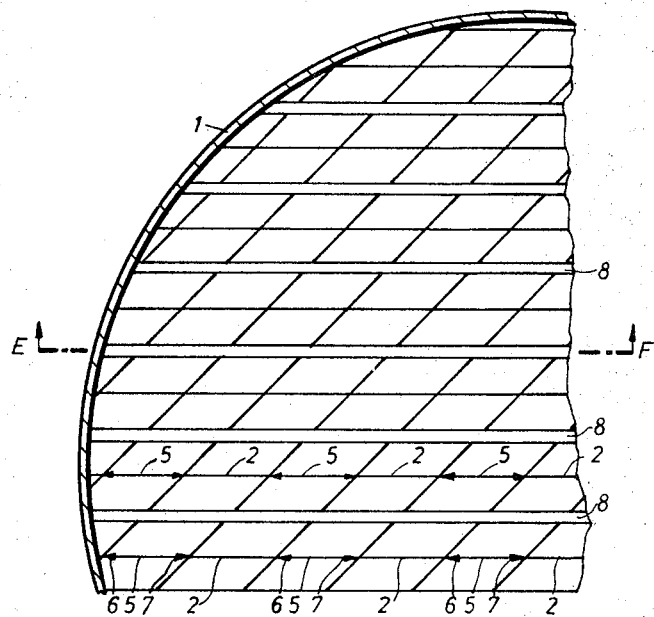
FIG. 7 is a plan view of the upper edge of the plate shown in FIG. 6.

The replaceable plates shown in FIGS. 6 and 7 may also be made from metal strips folded zig-zag fashion with creases extending obliquely of the side edges, the strips being attached to one another along their longitudinal edges.

A sprinkler or an ordinary distributor wheel may be used for introducing liquid at the top of the trickle column according to the invention.

Tests conducted on a trickle column according to the invention, with a specific surface of about 200 m.$^2$/m.$^3$, have revealed a pressure loss of 0.7 mm. water column per theoretical plate at an air flow of 1 metre/second.

The plates may be made of a material suited to the purpose for which they are to be used, in particular of a metal or of a plastics material.

What is claimed is:
1. A trickle column with flights of plates which are folded zig-zag fashion or are corrugated and which are arranged horizontally one above the other in the column tower in such a way as to cross alternately, being provided with openings for ascending vapours, wherein the openings are arranged crosswise to the folded edges or channels of the plates, the portions left between the open- ings being in the form of drainage pockets for the liquid, the openings of each plate overlaying drainage pocket portions of the next lower plate.

2. A trickle column as claimed in claim 1, wherein the openings are in the form of parallel slots arranged at equal distances apart which are staggered alternately relative to the adjacent edges or channels in the plate.

3. A trickle column as claimed in claim 1, wherein the openings are in the form of cutouts parallel to one another extending transversely of boundary flanges in the plate parallel to the edges or channels, the cutouts being stamped portions of the plate connected with the flanges parallel to the edges or channels, alternately bent in opposite directions out of the plane of the plates.

4. A trickle column as claimed in claim 1, wherein the slots or cutouts are arranged obliquely of the folded edges or channels of the plates.

References Cited

UNITED STATES PATENTS 2,998,234  8/1961  Haselden _____ 261—113

FRANK W. LUTTER, Primary Examiner

S. H. MARKOWITZ, Assistant Examiner